(12) United States Patent
Weld et al.

(10) Patent No.: US 6,588,942 B1
(45) Date of Patent: Jul. 8, 2003

(54) OPTICAL SYSTEM HAVING IMPROVED FIBER-DEVICE COUPLING

(75) Inventors: John David Weld, Ledgewood, NJ (US); Whitney White, Summit, NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/544,030

(22) Filed: Apr. 6, 2000

(51) Int. Cl.[7] .................................................. G02B 6/36
(52) U.S. Cl. .............................. 385/88; 385/92; 385/93
(58) Field of Search ................................ 385/88–94, 49

(56) References Cited

U.S. PATENT DOCUMENTS

| | | |
|---|---|---|
| 4,691,986 A | 9/1987 | Aberson, Jr. et al. |
| 5,142,600 A | 8/1992 | Ortiz, Jr. |
| 5,253,310 A | 10/1993 | Delbare et al. |
| 5,278,929 A * | 1/1994 | Tanisawa et al. .............. 385/93 |
| 5,309,537 A | 5/1994 | Chun et al. |
| 5,311,604 A | 5/1994 | Rogner et al. |
| 5,371,822 A * | 12/1994 | Horwitz et al. ................ 385/89 |
| 5,450,519 A | 9/1995 | Iwanski et al. |
| 5,790,733 A | 8/1998 | Smith et al. |
| 5,812,571 A * | 9/1998 | Peters .......................... 372/36 |
| 5,861,636 A | 1/1999 | Dutta et al. |
| 5,913,002 A | 6/1999 | Jiang |
| 5,940,562 A | 8/1999 | Henson et al. |
| 5,940,564 A | 8/1999 | Jewell |
| 6,015,239 A * | 1/2000 | Moore ........................... 385/92 |

* cited by examiner

*Primary Examiner*—Hemang Sanghavi
(74) *Attorney, Agent, or Firm*—Law Office of Leo Zucker

(57) ABSTRACT

A system containing an improved adapter for passively aligning an active device such as a transceiver with an optical fiber having a 100 to 250 μm core is provided, such that the resulting coupling is within alignment tolerances, and provides desired coupling efficiencies and bit rates. In one embodiment, the system contains a packaged active device having a window or a lens, an optical fiber having a core of a diameter ranging from 100 to 250 μm, and a fiber connector attached to an end of the optical fiber such that a fiber endface is provided. The system further contains an adapter comprising a first receptacle that secures the fiber connector and a second receptacle that secures the packaged device, wherein the exterior of the device package, in combination with the second receptacle, itself provides passive alignment within the adapter.

20 Claims, 1 Drawing Sheet

OPTICAL SYSTEM HAVING IMPROVED FIBER-DEVICE COUPLING

BACKGROUND OF THE INVENTION

1. Field of the Invention

The invention relates to optical fiber communications systems, in particular systems using plastic or silica fiber having typical core diameters of 100 to 250 μm.

2. Discussion of the Related Art

Presently, the majority of optical fiber communication systems use silica-based fiber having typical core diameters of 62.5 μm or less. For such cores, the alignment tolerances are very small, e.g., 10 μm, when coupling a fiber to a device such as a transceiver. (Alignment tolerance indicates the allowable range of variation from the desired alignment position between device and fiber.) Thus, to achieve acceptable coupling efficiency, active alignment between the device and fiber is used. Active alignment involves, for example, placing a device and fiber adjacent one another, directing light from the device into the fiber, and measuring the output at the opposite end of the fiber. The relative positions of the device and/or fiber are adjusted until the output reaches acceptable levels, and then the coupling is secured, typically by a fast-curing adhesive or laser welding. Because such active alignment is complex, labor intensive, and expensive, passive alignment methods are preferred.

In passive alignment, a coupling structure is devised to provide adequate mechanical alignment between the device and fiber without any active alignment steps. Because passive alignment is usually feasible only for much higher alignment tolerances than found with typical silica-based telecommunications fiber, the technique is generally used only with large core fibers, e.g., 500 to 1000 μm diameters. Moreover, because the only economically viable fibers with such large core diameters exhibit relatively poor loss and bandwidth characteristics, such passively-aligned couplings are typically found only in very short distance, low data rate systems, e.g., 50 meter links using 1 mm conventional plastic optical fiber at bit rates of 100 Mbits/second or less. Also, it is difficult to couple such large core fibers to high speed (1 Gbit/sec or more) detectors, since such detectors typically have an active area only 150 mm in diameter or less. In addition, attempts to extend passive alignment techniques to smaller-core fibers are complicated by the fact that optoelectronic device manufacturers anticipate use of active alignment. Specifically, the configuration of active devices within their packages, i.e., the exact location of the device with respect to the exterior of the package, is often inconsistent. For these numerous reasons, attempts to use inexpensive passive alignment have been largely restricted to fibers with core diameter greater than 500 μm.

Recently, a new generation of relatively large core fibers with much higher bandwidths have been developed, including plastic optical fiber (generally graded-index perfluorinated fiber). These fibers have typical core diameters of 100 to 250 μm. This core size allows for higher alignment tolerances than typical silica-based telecommunications fiber, but still makes the fiber compatible with Gbit/sec detectors. Thus, improved, low cost alignment techniques suitable for providing acceptable properties with fibers having core diameters of 100 to 250 μm are desired.

SUMMARY OF THE INVENTION

The invention provides a system containing an adapter for passively aligning an active device such as a transceiver with an optical fiber having a 100 to 250 μm core, such that the resulting coupling is within alignment tolerances, and provides desired coupling efficiencies and bit rates. In one embodiment, reflected in FIG. 1, the system contains a packaged active device 10 having a window or a lens 12, an optical fiber 14 having a core 16 of a diameter ranging from 100 to 250 μm, and a fiber connector 18 attached to an end of the optical fiber such that a fiber endface 20 is provided. The system further contains an adapter 22 comprising a first receptacle 24 that secures the fiber connector and a second receptacle 26 that secures the packaged device, such that the device and the fiber endface are optically aligned. (Optically aligned indicates that light is able to travel from the fiber core to the device and vice versa.)

In a departure from the prior art, the exterior of the device package, in combination with the second receptacle, itself provides passive alignment within the adapter. And, in contrast to current passively-aligned systems, the system of the invention is able to achieve tolerances within 60 μm, optionally within 35 μm, i.e., the deviation from perfect alignment between the optical axis of the device and the center of the fiber core will be no more than 60 μm, or no more than 35 μm. Such tolerances make it possible to achieve, for example, a coupling efficiency of at least 50%, optionally at least 90%, in fiber having a 100 to 250 μm diameter core. It is also possible to achieve bit rates of 1 Gbit/sec or greater, and even as high as 10 Gbit/sec for some applications.

The adapter is designed to securely hold the package and fiber connector in an arrangement within alignment tolerances. It is possible to design the adapter using design guidelines for thermoplastic resins, such that the device package is able to be snap-fit, e.g., by use of conventional cantilever snap joints using flexural snap-fitting arms or by forming the adapter from a relatively compliant or elastomeric material that plastically deforms upon insertion of the device package. Alternatively, it is possible to use adhesive to secure the package. It is also possible to form the adapter around all or a portion of the packaged device, e.g., by placing a portion of the package into a mold and then filling the mold with the adapter material (thereby making at least a portion of the package integral with the adapter). The receptacle for accepting a fiber connector is designed for the particular connector of interest, which is similarly capable of being snap-fit or adhered. In practice, the active device and adapter will generally be pre-assembled prior to installation of a system, and the fiber will then be connected during the actual installation.

DETAILED DESCRIPTION OF THE INVENTION

Figure 1:
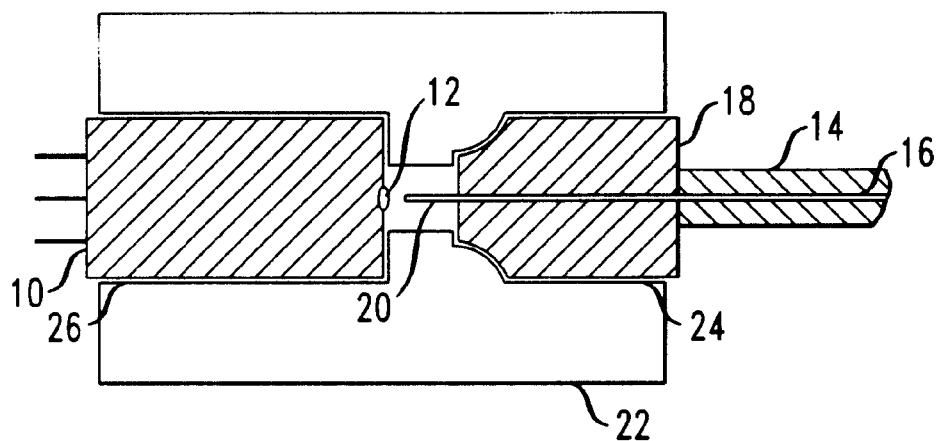
FIG. 1 shows an embodiment of the invention.

FIG. 1 shows an embodiment of the invention. A packaged active device 10 is provided. The device is generally a laser or a photodetector, although other active devices useful in optical communications systems are also possible.

Figure 2:
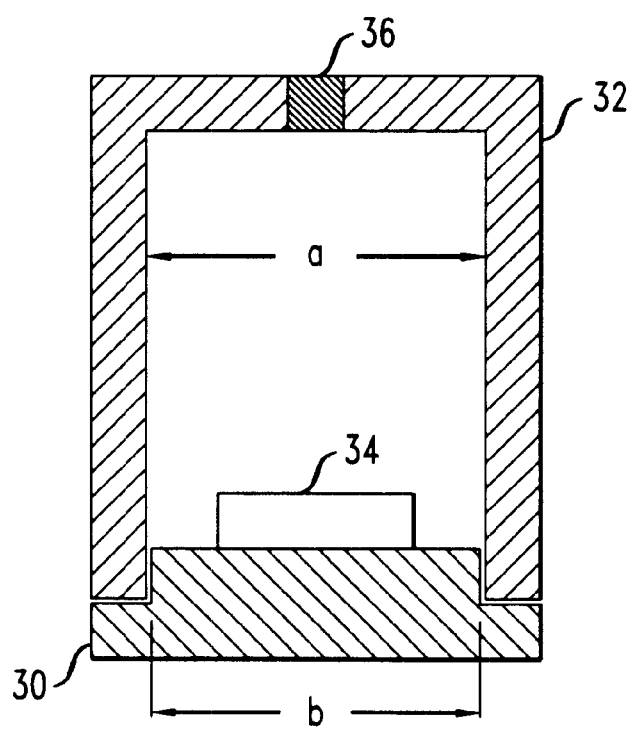
FIG. 2 shows a TO-type can package for active devices.

The device is packaged by any conventional technique, including a TO-type can, as shown in FIG. 2. The TO-type can contains a header 30 on which the device 34 is placed, and a cap 32 set onto the header 30, as shown. In photonics applications, a lens or window is located in the package (shown as element 36 in the TO-type can of FIG. 2), to allow light to pass to or from the device.

In prior art devices, the cap and header typically are not fabricated to close tolerances, due to the anticipation that active alignment will be performed. Thus, the cap is often not centered on the header, and, in addition, the position of the cap on the header tends to vary from package to package. Without active alignment, this inconsistent positioning of the cap has the potential to substantially impair the performance of the system, by reducing the amount of light traveling between the device and an optical fiber. In the invention, it is therefore advantageous for devices packaged in TO-type or similar cans to have a matched head and cap assembly, meaning that that inner diameter a of the cap 32 is approximately equal to the diameter b of the header 30, i.e., within 50 $\mu$m. This close match provides consistency in the location of the lens or window 36, such that the properties of the overall system are impaired only slightly, if at all, by the package assembly itself. Other packages should similarly be formed to relatively consistent guidelines.

A key aspect of the invention is the adapter 22, used to optically align the active device with an optical fiber 14. The adapter 22 contains a first receptacle 24 for securing a fiber connector 18 and a second receptacle 26 for securing the active device package 10.

The second receptacle 26 in the adapter 22 is capable of being designed to accept any particular package configuration In particular, the exterior of the device package, in combination with the second receptacle, itself provides passive alignment within the adapter. The securing step for the packaged active device is performed by any of a variety of techniques. In one aspect, the adapter is formed from a relatively compliant or elastomeric material that plastically deforms upon insertion of the package, such that the deformed material holds the package securely in place. In another aspect, an adhesive is used to secure the package in the receptacle. In an alternative aspect, physical extensions from the package and/or receptacle secure the package, e.g., knobs, tension mechanisms, cantilever snap joints, etc.

Instead of placing the device package into a pre-formed adapter, it is possible to form the adapter around a portion of the package. For example, it is possible to place a packaged device into a mold, and then fill the mold with the adapter material, i.e., overmold the packaged device (thereby making the adapter integral with a portion of the packaged device). When such overmolding is performed, a pin is typically extended into the mold to cover and protect the lens or window of the device during the molding process. It is also possible to overmold a portion of a packaged device, and then assemble a further packaging component around the packaged device and/or a portion of the adapter. (Such overmolded adapters are also considered to have a second receptacle in which the active device package is secured, e.g., receptacle 26 in FIG. 1.)

Thermoplastic injection molding is suitable for manufacturing the adapter, when physical deformation or other mechanical techniques are used to secure the active device package 10 in the adapter 22. It is possible to use a variety of resins for such molding, including polycarbonate, polycarbonate and acrylonitrile-butadiene-styrene (ABS) blends, ABS alone, polyamide 6 (nylon), or thermoplastic polyurethane. When an overmolding technique is used with the adapter, a transfer molding process is typically used, e.g., with a thermoset epoxy molding compound. Other manufacturing techniques are also possible.

In practical application, the active device package is typically secured (e.g., inserted or overmolded) in the adapter prior to installation/assembly of the overall system.

The optical fiber 14 is then typically installed on-site. The optical fiber 14 has a core 16 of a diameter of 100 to 250 $\mu$m, and is typically a plastic optical fiber (POF)—generally a perfluorinated graded-index POF, or a hard clad silica fiber. Such fibers are typically being used and/or considered for applications in local area networks, home networks, and inside communications equipment, typically at lengths ranging from several centimeters to 500 meters. Onto an end of the fiber is placed a fiber connector 18, for which the receptacle 24 in the adapter 22 is designed. And the connector 18 is then secured into the adapter 22 by any suitable technique. Conventional latches such as LC or SC connectors are possible, for example.

This passive alignment technique is able to provide alignment within acceptable tolerances to provide desirable coupling efficiency. The system of the invention is able to achieve tolerances within 60 $\mu$m, optionally within 35 $\mu$m, i.e., the deviation from perfect alignment between the optical axis of the device and the center of the fiber core will be no more than 60 $\mu$m, or no more than 35 $\mu$m. Such tolerances make it possible to achieve, for example, a coupling efficiency of at least 50%, optionally at least 90%, in fiber having a 100 to 250 $\mu$m diameter core. There is a trade-off between coupling efficiency and alignment tolerance, however. The higher the desired coupling efficiency, the lower the allowable alignment tolerance. And if a relatively low coupling efficiency is acceptable for a particular application, a high alignment tolerance is achieved.

Systems according to the invention, due in large part to the adapter, are able to achieve relatively high bit rates. Specifically, bit rates of at least 100 Mbits/sec are achievable, more typically rates of at least 1 Gbit/sec. Rates of at least 10 Gbit/sec are also possible, at least for short lengths, e.g., 100 m or less of perfluorinated graded index POF or for about 8 inches or less of step index silica fiber. Such rates are not attainable with previous passively-aligned systems, e.g., systems using fiber having a core diameter of 500 $\mu$m or more, since such fiber cannot be practically coupled to high speed detectors.

To obtain higher coupling efficiency or a higher alignment tolerance, it is useful to select a particular window or lens for use with the active device. Typically, the window or lens is provided in the active device package, in which case it is possible to have a hermetically sealed device. But it is also possible for the window or lens to be located elsewhere, e.g., within the adapter itself. It is possible to use a collimating lens to provide a beam of a specific optical diameter, where the diameter is selected to provide an acceptable coupling efficiency at an acceptable alignment tolerance. A focusing lens is also capable of being used. Where high coupling efficiency is desired, the adapter is designed to position the fiber endface in the focal plane of the focusing lens. But this arrangement also reduces the alignment tolerance. It is therefore possible to design the adapter to position the fiber endface behind or in front of the focal plane of the lens, in order to increase this alignment tolerance somewhat.

As noted above, optical communications systems incorporating such device/fiber assemblies are useful for a variety of applications, including computer networking, mobile networking in surface vehicles and aircraft, home appliance networking, and factory automation.

Other embodiments of the invention will be apparent to those skilled in the art from consideration of the specification and practice of the invention disclosed herein.

What is claimed is:

1. A system for passively aligning an optical device with an end face of an optical fiber having a fiber core of a certain diameter, comprising:

an optical device having an optical axis;

a device package for containing the optical device, wherein a light passage is formed in an exterior portion of the device package, and the optical device is mounted in said package with a determined dimensional tolerance such as to maintain a certain alignment between the device and the light passage in the device package; and an adapter including an adapter body having a device receptacle formed to accept and secure the device package, and a connector receptacle formed to receive and secure a fiber connector that is attached to the optical fiber to provide the end face of the fiber;

wherein a portion of the adapter body that forms the device receptacle comprises a compliant or elastomeric material that plastically deforms upon insertion of the device package so that the deformed material holds the package securely in place; and wherein the adapter body is constructed and arranged so that when the device package is secured in the device receptacle and the fiber connector is secured in the connector receptacle, the center of the fiber core at the end face of the fiber is substantially aligned with, the optical axis of the optical device through the light passage in the exterior portion of the device package.

2. A system according to claim 1, wherein the alignment maintained between the optical device and the light passage in the device package, and the form of the device receptacle in the adapter body, cooperate with one another so that the alignment between the optical axis of the device and the center of the fiber core deviates not more than 60 $\mu$m when the fiber connector is secured in the connector receptacle in the adapter body.

3. A system according to claim 1, wherein the alignment maintained between the optical device and the light passage in the device.package, and the form of the device receptacle in the adapter body, cooperate with one another so that the alignment between the optical axis of the device and the center of the fiber core deviates not more than 35 $\mu$m when the fiber connector is secured in the connector receptacle in the adapter body.

4. A system according to claim 1, wherein the optical fiber has a core diameter in the range of from about 100 $\mu$m to about 250 $\mu$m.

5. The system of claim 1, wherein the device package is secured in the device receptacle in the adapter body by friction and in the absence of an adhesive.

6. The system of claim 1, wherein the device package is in the form of a TO-type can comprising a header, and a cap supported over the header.

7. The system of claim 6, wherein the TO-type can comprises a matched cap and header assembly.

8. The system of claim 1, wherein the optical device is a laser diode.

9. The system of claim 1, wherein the optical device is a photo detector.

10. The system of claim 1, wherein the light passage formed in the device package comprises an open window.

11. The system of claim 1, wherein the light passage formed in the device package comprises a collimating lens.

12. The system of claim 1, wherein the light passage formed in the device package comprises a focusing lens having a focal plane.

13. The system of claim 12, wherein the adapter body is constructed and arranged so that when the fiber connector is secured in the connector receptacle, the end face of the fiber is located in the focal plane of the focusing lens.

14. The system of claim 12, wherein the adapter body is constructed and arranged so that when the fiber connector is secured in the connector receptacle, the fiber end face is located either behind or in front of the focal plane of the focusing lens.

15. The system of claim 1, wherein the optical fiber is a perfluorinated plastics optical fiber.

16. The system of claim 1, wherein the system supports a transmission bit rate of at least 1 Gbit/second between the optical fiber and the optical device.

17. The system of claim 1, wherein the system supports a transmission bit rate of at least 10 Gbits/second between the optical fiber and the optical device.

18. A system according to claim 1, wherein the connector receptacle in the adapter body is formed to receive and secure a type LC fiber connector.

19. A system according to claim 1, wherein the connector receptacle in the adapter body is formed to receive and secure a type SC fiber connector.

20. A system according to claim 1, wherein the adapter body is formed of polycarbonate (PC), ABS, or a blend of PC and ABS.

* * * * *